United States Patent [19]

Simons

[11] 4,234,755
[45] Nov. 18, 1980

[54] ADAPTOR FOR PAPER-INSULATED, LEAD-JACKETED ELECTRICAL CABLES

[75] Inventor: Craig W. Simons, Hackettstown, N.J.

[73] Assignee: Amerace Corporation, New York, N.Y.

[21] Appl. No.: 920,401

[22] Filed: Jun. 29, 1978

[51] Int. Cl.³ .................... H02G 15/23; H02G 1/14
[52] U.S. Cl. .................................... 174/19; 174/73 R
[58] Field of Search ............ 174/73 R, 73 SC, 75 D, 174/19, 20

[56] References Cited

U.S. PATENT DOCUMENTS

| | | | |
|---|---|---|---|
| 2,373,843 | 4/1945 | Nicholas | 174/73 R |
| 2,523,313 | 9/1950 | Lee | 174/73 R X |
| 2,967,901 | 1/1961 | Priaroggia | 174/73 R |
| 3,242,255 | 3/1966 | Falkenstein et al. | 174/20 X |
| 3,317,654 | 5/1967 | Yonkers | 174/73 R |
| 3,471,628 | 10/1969 | Harmon | 174/19 |
| 3,548,070 | 12/1970 | Duenke | 174/73 R X |
| 3,796,821 | 3/1974 | Lusk | 174/73 R |
| 3,876,820 | 4/1975 | Mashikian | 174/73 R X |
| 4,110,550 | 8/1978 | Di Pietro | 174/19 |
| 4,159,860 | 7/1979 | Broad | 174/73 R X |

FOREIGN PATENT DOCUMENTS 542842  1/1942  United Kingdom ...................... 174/20

Primary Examiner—B. A. Reynolds
Assistant Examiner—E. F. Borchelt
Attorney, Agent, or Firm—Arthur Jacob; Richard A. Craig

[57] ABSTRACT

An adaptor for placement at the terminus of an electrical power distribution cable having diametral dimensions falling within a given range of sizes, the cable being of the oil-filled type including a conductor, a paper insulator and a lead jacket, to seal the terminus and enable installation, in the field, of an electrical connector for use in an electrical power distribution system. The adaptor includes a sleeve portion of insulating material for placement over the cable insulation, a conductor-sealing portion for receiving the conductor of the cable, a jacket-sealing portion for juxtaposition with the lead jacket to seal the juncture between the lead jacket and the adaptor, a dielectric filler for placement between the cable insulation and the sleeve portion, and an electrical stress control member for controlling electrical stress along the interface between the cable insulation and the dielectric filler.

18 Claims, 6 Drawing Figures

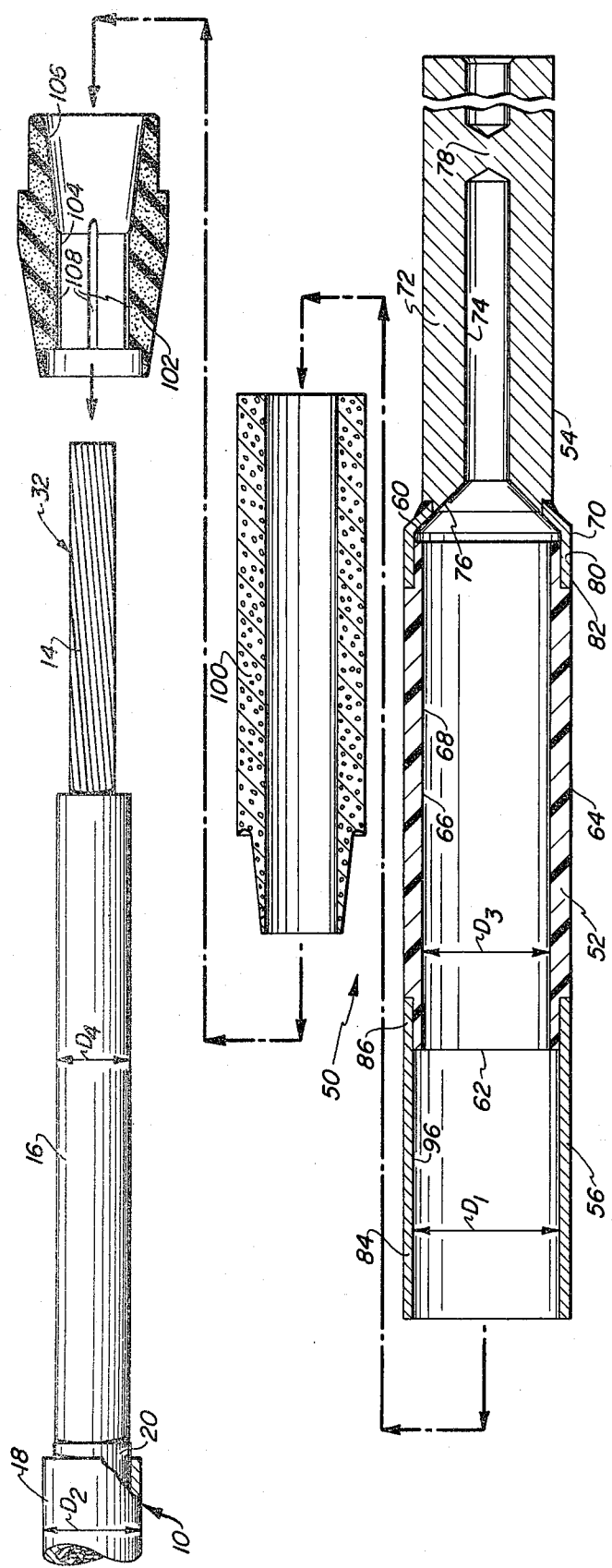
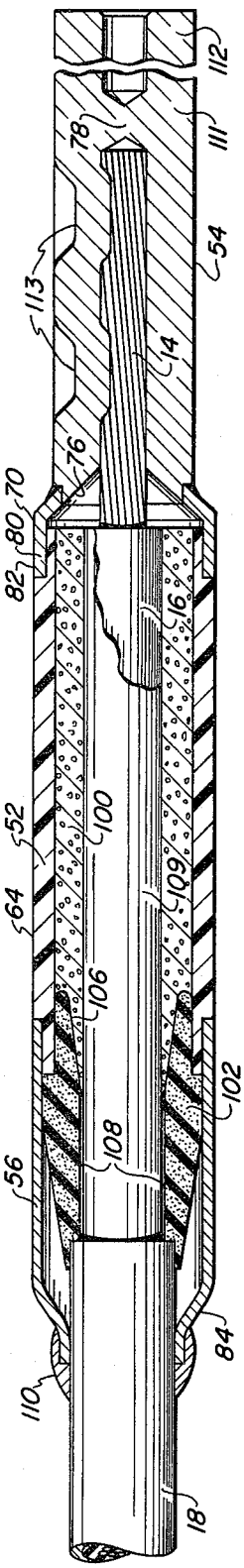
FIG. 1
FIG. 2

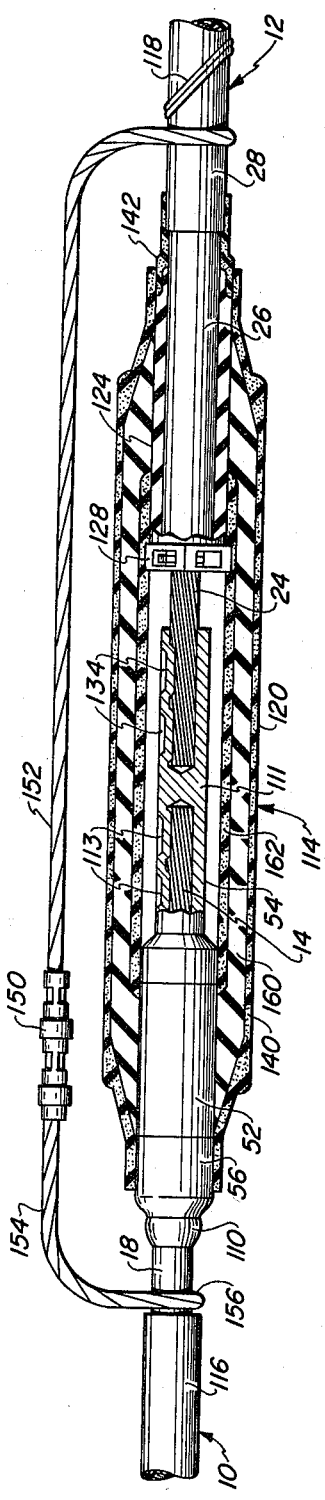
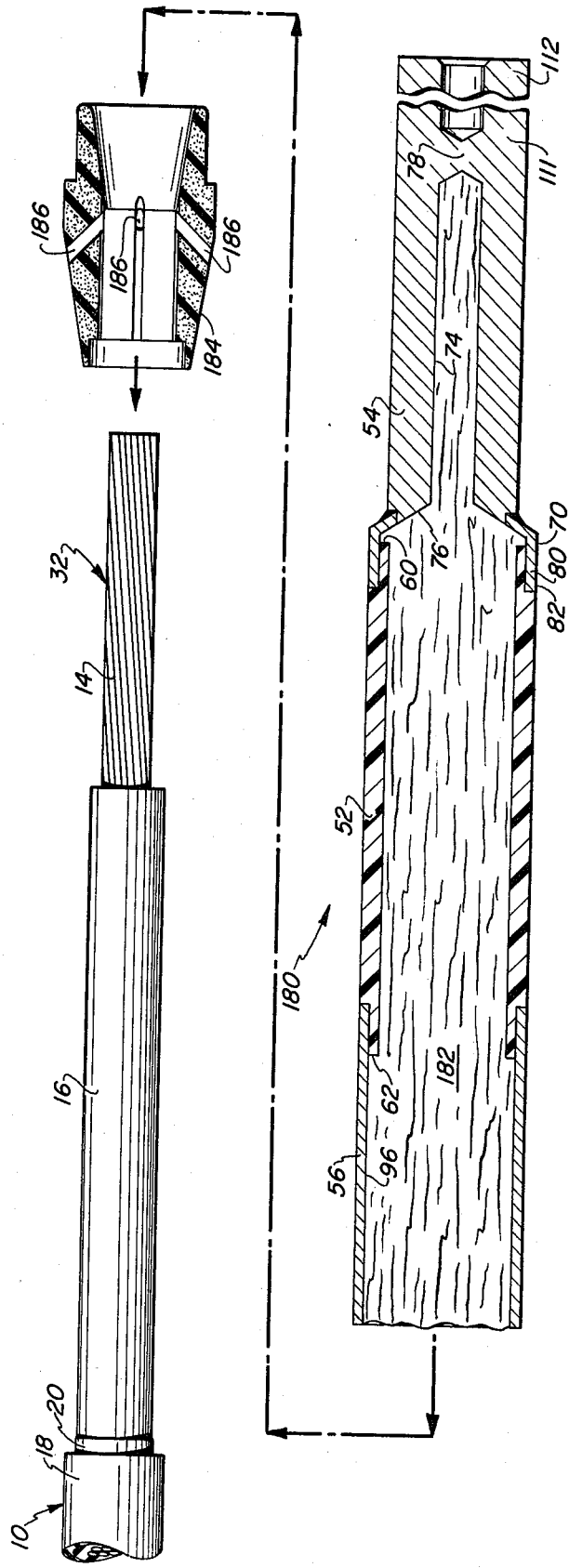
FIG. 3
FIG. 4

ADAPTOR FOR PAPER-INSULATED, LEAD-JACKETED ELECTRICAL CABLES

The present invention relates generally to electrical connections and pertains, more specifically, to an adaptor for sealing the terminus of an oil-filled, paper insulated, lead-jacketed electrical power distribution cable and enabling the installation, in the field, of an electrical connector of the type employing a premolded elastomeric component part.

In recent years, the advent of extruded solid dielectric cables, such as polyethylene insulated electrical cables, has led to the displacement of the previously used oil-filled, paper-insulated, lead-jacketed cables (known as "PILC" cables) in the installation of electrical power distribution systems. However, many existing systems still contain operable paper-insulated, lead-jacketed cables. When a section of existing PILC cable is faulted, a need arises to splice a new cable, either in the form of another PILC cable or in the form of a modern extruded solid dielectric cable, in the field, to the existing PILC cable in the network. In addition, it is sometimes necessary merely to terminate an existing PILC cable, in the field, with an appropriate terminating device.

Numerous splices and terminators currently are available for use with paper-insulated, lead-jacketed cables. But these devices generally are bulky and require skilled workers to achieve the oil stops, taping and lead wiping necessary for the use of such devices. A need has arisen for a simplified splice or termination which is easily installed in the field at the terminus of an oil-filled, paper-insulated, lead-jacketed electrical power cable. In addition, such a splice can be used to expand an existing distribution system using PILC cables, by providing means for simplified joining of PILC cables.

Along with the development of the modern extruded solid dielectric cables, a variety of electrical connectors has been evolved, including splice connectors and terminators, which are constructed of premolded elastomeric component parts easily assembled in the field to establish connections and terminations in solid dielectric cables. In an earlier application, Ser. No. 737,421, filed Nov. 1, 1976, now U.S. Pat. No. 4,110,550 there is described a method and a device capable of adapting the ubiquitous oil-filled, paper-insulated, lead-jacketed cable for use with component parts of such up-to-date electrical connectors in constructing connections between the older type PILC cable and the newer solid dielectric cable and in merely terminating the older type PILC cable with a modern terminator. It would be advantageous to be able to expand the use of the earlier-disclosed method and device to cover a wide range of cable sizes as well as the different cable constructions in an economical manner.

Accordingly, it is an object of the present invention to provide an adaptor for sealing the terminus of an oil-filled, paper-insulated, lead-jacketed (PILC) electrical power cable having diametral dimensions falling within a wide range of sizes and adapting the cable for use with electrical connectors of the type employing premolded elastomeric component parts for connection or termination of the cable in an electrical power distribution system.

Another object of the invention is to provide an adaptor, as described above, which is especially well-suited to use in the field by workers who need not be highly skilled in operations such as taping, complex lead wiping and the construction of oil stops.

Still another object of the invention is to provide an adaptor as described above, which, when applied to the terminus of a paper-insulated, lead-jacketed cable, will render the terminus compatible with currently available electrical connectors of the type employed in making connections and terminations, in the field, in the installation of power distribution systems utilizing extruded solid dielectric cables.

A further object of the invention is to provide an adaptor, as described above, which has a relatively simple construction capable of reliable service in the field and enabling simplified operations, in the field, for the maintenance and installation of electrical power distribution systems.

A still further object of the invention is to simplify the expansion, repair and general modernization of existing electrical power distribution systems.

Yet another object of the invention is to provide an adaptor of the type described above which is capable of accommodating a wide range of cable sizes without corresponding size changes in basic component parts of the adaptor.

A further object of the invention is to provide an adaptor of the type described above which enables splice connections between PILC cables utilizing modern electrical connectors of the type employing premolded elastomeric components parts.

A still further object of the invention is to provide an adaptor, as described above, having enhanced electrical and mechanical performance characteristics while being economical to manufacture in large quantities of uniform high quality.

The above objects, as well as still further objects and advantages, are attained by the invention, which may be described briefly as an adaptor capable of placement at the terminus of a high voltage electrical cable having diametral dimensions falling within a given range of sizes, the cable being of the oil-filled type including a conductor, a paper insulator and a lead jacket, each having a terminal end adjacent the cable terminus, to seal the terminus and enable installation of an electrical connector of the type employing a premolded elastomeric component part for use in an electrical power distribution system, the adaptor comprising a sleeve portion of insulating material extending axially between a first end and a second end, the sleeve portion having an axially extending outer surface and an axially extending opening with an inside diameter larger than the diameter of the insulator of the cable of largest diameter in said given range of sizes, said insulating material being essentially impervious to water and to the oil in the cable, a conductor-sealing portion integral with the first end of the sleeve portion and sealing the opening in the sleeve portion adjacent the first end thereof, the conductor-sealing portion having an axially extending, electrically conductive sheath including an internal passage communicating with the opening in the sleeve portion and corresponding in diameter to the diameter of the conductor of the cable, the internal passage having a closed end remote from the first end of the sleeve, a jacket-sealing portion integral with the second end of the sleeve portion, the jacket-sealing portion including an axially extending tubular-walled portion capable of being juxtaposed with the lead jacket to seal the junction between the lead jacket and the adaptor, a dielectric filler for placement between the insulator of the cable and the sleeve portion of insulating material to fill any void therebetween, and an electrical stress control member for placement in juxtaposition with the terminal end of the lead jacket for controlling electrical stress along the interface between the insulator of the cable and the dielectric filler.

The invention will be more fully understood, while still further objects and advantages will become apparent, by reference to the following detailed description of preferred embodiments of the invention illustrated in the accompanying drawing, in which:

FIG. 1 is an exploded longitudinal cross-sectional view showing an adaptor constructed in accordance with the invention about to be installed at the terminus of a high voltage cable in the power distribution system;

FIG. 2 is a longitudinal cross-sectional view of the adaptor of FIG. 1 in place at the cable terminus;

FIG. 3 is a longitudinal cross-sectional view of a fully assembled splice connection;

FIG. 4 is an exploded longitudinal cross-sectional view showing another adaptor constructed in accordance with the invention about to be installed at the terminus of a high voltage cable in a power distribution system;

Figure 5:
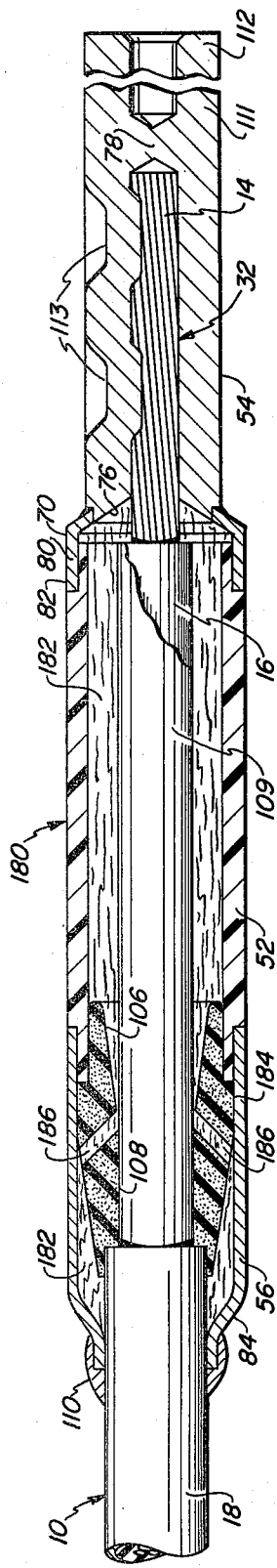
FIG. 5 is a longitudinal cross-sectional view of the adaptor of FIG. 4 in place at the cable terminus.

Referring now to the drawing, and especially to FIGS. 1 through 3 thereof, a splice connection is to be made between high voltage electrical cables 10 and 12 (see FIG. 3) in a power distribution system. Cable 10 is an oil-filled, paper-insulated, lead-jacketed (PILC) cable in an existing power distribution system. Cable 12 is a more modern extruded solid dielectric cable which is to be spliced into the system. However, cable 12 could be another PILC cable similar to cable 10. The splice is to be made in the field, utilizing an electrical connector of the type employing premolded elastomeric component parts, all of which will be explained, in detail, below.

Cable 10 includes a conductor 14 sheathed within a paper insulator 16 which, in turn, is jacketed within a lead jacket 18 forming an external shield. A relatively thin layer 20 of conductive material, in the form of carbon impregnated paper tape, is located between the paper insulator 16 and the lead jacket 18 and serves as an internal shield. Cable 10 is filled with a dielectric oil (not shown). In contrast, cable 12 includes a conductor 24 sheathed within an insulator 26 of an extruded solid dielectric such as polyethylene which, in turn, is surrounded by an external shield 28 of a conductive extruded solid material, such as conductive polyethylene.

In order to effect a splice connection between the terminal ends of cables 10 and 12, terminus 32 of cable 10 is prepared by first removing a portion of the lead jacket 18, and a portion of layer 20, to expose a length of paper insulator 16 adjacent the terminus 32 of the cable and then removing a portion of the exposed paper insulator to bare a length of conductor 14 at the terminus 32 of the cable 10. Layer 20 extends slightly beyond the terminal end of lead jacket 18. An adaptor 50, constructed in accordance with the invention, is slipped over the terminus 32 of cable 10 and is moved along the cable to the position shown in FIG. 2 so as to enclose the cable terminus within the adaptor.

As best seen in FIG. 1, adaptor 50 is an integal structure including a central sleeve portion in the form of sleeve member 52, a forward conductor-sealing portion in the form of conductor-sealing member 54 and a rearward jacket-sealing portion in the form of jacket-sealing member 56. Sleeve member 52 is generally tubular, extends axially between a forward end 60 and a rearward end 62, and is constructed of insulating material. Outer surface 64 of the sleeve member 52 is generally cylindrical and extends axially along the sleeve member, while inner surface 66 bounds an axially extending opening 68 passing through the sleeve member. In addition to having high dielectric properties, the material of sleeve member 52 is chosen for its ability to resist the absorption or transmission of water, or oil of the type employed within cable 10. A suitable material for sleeve member 52 may be chosen from a variety of glass and ceramic materials, as well as from synthetic resin materials.

Conductor-sealing member 54 is integral with the sleeve member 52 and includes a transition member in the form of a collar 70 affixed to the forward end 60 of the sleeve member 52 and a sheath in the form of a ferrule 72 affixed to the collar 70 and extending axially therefrom. Ferrule 72 has an internal passage 74 communicating with opening 68 in sleeve member 52 through a throat 76 which tapers from adjacent the larger diameter of opening 68 to the smaller diameter of passage 74, for purposes which will be described more fully below. Ferrule 72 is closed by an end wall 78 to form a sealed ferrule. A skirt 80 extends rearwardly from the other end of the conductor-sealing member 54, the skirt 80 and collar 70 having a common outer surface 82 which is in a surface common with outer surface 64 of sleeve member 52.

Jacket-sealing member 56 is integral with sleeve member 52 and includes a tubular-walled portion 84 projecting axially rearwardly and a forward-extending further portion 86 affixed to the rearward end 62 of sleeve member 52. Jacket-sealing member 56 includes a bore 96 having an inside diameter which very nearly matches the inside diameter of opening 68 in sleeve member 52. Jacket-sealing member 56 preferably is constructed of a conductive metal, such as lead, which is relatively easy to deform permanently and which can be joined readily to lead jacket 18, in the field, as by lead wiping techniques, for purposes which will become apparent below.

Adaptor 50 is constructed so as to enable sleeve member 52, collar 70 of conductor-sealing member 54, and jacket-sealing member 56 to be usable in connection with a wide range of sizes for cable 10. Thus, the diameter $D_1$ of bore 96 of jacket-sealing member 56 is large enough to assure that jacket-sealing member 56 will receive lead jacket 18 of a cable having the largest diameter $D_2$ in the range of cable sizes to be accommodated, as illustrated in FIG. 2. The inside diameter $D_3$ of opening 68 is larger than the diameter $D_4$ of insulator 16 of a cable having the largest diameter in the range of cable sizes to be accommodated. The difference between $D_1$ and $D_2$ or between $D_3$ and $D_4$ will vary depending upon cable size, but $D_1$ and $D_3$ are made large enough so that a space will exist between the cable and the sleeve member 52, and between the cable and the jacket-sealing member 54. In order to fill that space and attain the electrical performance required in adaptor 50, a dielectric filler in the form of a further sleeve 100 of conformable elastomeric dielectric material is placed between the insulator 16 and the sleeve member 52 to fill any void therebetween. Sleeve 100 may be constructed of a closed cell sponge-like material in which the closed cells are of limited size and are filled with a selected gas so as to resist ionization under the voltages encountered in service. The compressibility of the material of sleeve 100 enables sleeve 100 to conform to the space occupied and fill all voids, despite the wide range of cable sizes to be accommodated. Sleeve 100 may be placed over insulator 16 as a separate component part prior to the installation of sleeve member 52, or may be joined with sleeve member 52 at the factory.

Electrical stress is controlled through the use of an electrical stress control member in the form of an annular member 102 of electrically conductive elastomeric material having a bore 104 with an inside diameter for gripping cable 10 adjacent the terminal end of lead jacket 18, as seen in FIG. 2. The outside diameter of annular member 102 engages the sleeve member 52 and the jacket-sealing member 54 adjacent the rearward end 62 of the sleeve member 52. Thus, the wall thickness of a particular chosen annular member 102 compensates for variations in the spacing between the cable and the adaptor due to the different cable sizes in the range to be accommodated. An outwardly flared stress control profile configuration is provided at 106 to establish the desired stress relief. Vents 108 are provided to vent any air from the assembly during installation.

Thus, manufacture of adaptor 50 for a wide range of cable size is made economical by enabling the use of a sleeve member 52 of a single size, joined with a jacket-sealing member 54 of a single size and a collar 70 of a single size. Size changes in the cable jacket 18 and insulator 16 are then accommodated by annular member 102 and sleeve 100. Size variations in conductor 14 are accommodated by the choice of an appropriate connector element, such as ferrule 72, which is joined to the collar 70. Collar 70 thus constitutes a transistion member to which can be attached an electrical connector element of various forms and sizes.

Referring now to FIG. 2, the terminus 32 of cable 10 is enclosed within adaptor 50 by placing the annular member 102 in position over the terminal end 48 of lead jacket 18 and the adjacent portion of insulator 16, placing the sleeve 100 over the remainder of the exposed length of insulator 16 and then placing the sleeve member 52, with jacket-sealing member 54 and ferrule 72, over the terminus 32 of cable 10.

The diameter of passage 74 within ferrule 72 is generally complementary to the diameter of the bared portion of conductor 14, the choice of passage diameter being determined by established tolerances which have become standard in the design of tubular electrical connectors of the type which generally are crimped to conductors of various sizes. The taper of throat 76 facilitates insertion and seating of the conductor 14 within the ferrule 72. In some instances, it may be desirable to wrap the exposed length of insulator 16 with a thin wrapping prior to insertion of the exposed length of insulator into sleeve member 52 so as to preclude unraveling of the paper of insulator 16. In the illustrated embodiment, a thin tubular wrapper 109 has been placed over the exposed length of insulator 16. Wrapper 109 may be fabricated of an elastic or heat-shrinkable material. Preferably, wrapper 109 is a tubular member of heat-shrinkable elastomer or silicone rubber tape. Where a wrapper 109 is employed, intimate contact is attained between the insulator 16 and the wrapper 109, and between the wrapper 109 and the inside surface of sleeve 100.

Once the adaptor 50 is properly seated at the terminus 32 of cable 10, a seal is effected between the tubular-walled portion 84 of the jacket-sealing member 56 and the lead jacket 18 by reforming portion 84 to the conical configuration shown in FIG. 2 so that the portion 84 is brought into intimate contact with lead jacket 18. The seal is completed by joining the portion 84 to the lead jacket 18, as by lead wiping at 110, to establish a watertight and oil-impervious seal.

In the illustrated embodiment, ferrule 72 is a part of an electrical connector in the form of a crimp barrel 111 having a counterpart ferrule 112 at the opposite end thereof. Crimp barrel 111 is crimped at 113 to conductor 14. As best seen in FIG. 3, a splice connection 114 is completed between cables 10 and 12, as will now be described.

In addition to a lead jacket 18, cable 10 includes a non-metallic protective cover 116. Cable 12 has a metal wire shield 118, in addition to the conductive extruded shield 28 which surrounds the cable insulation. Splice connection 114 employs a one-piece housing 120.

In making the splice connection 114, in the field, housing 120 is slipped over one of the cables 10 or 12 and moved along the cable away from the terminus thereof. The terminal ends of the cables are prepared as described and adaptor 50 is installed upon the terminus of cable 10. In the instance where cable 12 is another PILC cable, adaptor 50 would include a further sleeve member, and jacket-sealing member for installation over the terminus of cable 12 in a manner identical with the installation on cable 10, with a conductor-sealing member common to both adaptors. However, where cable 12 is a solid dielectric cable, as illustrated, a sleeve 124 is installed upon the terminus of cable 12. Sleeve 124 is retained against movement toward the terminal end of the conductor 24 of cable 12 (to the left, as viewed in FIG. 3) by a split retaining ring 128 which is clamped to the conductor 24 and abuts the confronting end of the sleeve 124. Conductor 24 is inserted into the other end of the crimp barrel 111. Crimps 134 secure conductor 24 in crimp barrel 111.

The housing 120 is then moved over the crimped connection effected by crimp barrel 111 to take the position illustrated in FIG. 3, wherein it is seen that the internal surface of housing 120 grips the complementary outer surface of sleeve member 52 in the interference fit attained in splice connectors of the type described. The shield provided by lead jacket 18 is continued electrically through the electrically conductive outer portion 140 of housing 120 and the electrically conductive rearward portion 142 of sleeve 124 to the shield 28 of cable 12. The ground provided by wire shield 118 of cable 12 is connected to the lead jacket 18 of cable 10 by a crimped connection 150 between an extension 152 of the wire of shield 118 and a length of grounding cable 154 soldered to the lead jacket 18 at 156. Housing 120 includes an intermediate portion 160 of insulating elastomeric material and an internal shielding system in the form of internal portion 162 of conductive elastomeric material.

Turning now to FIGS. 4 and 5, another adaptor 180 is shown constructed in accordance with the invention and is about to be installed at the terminus 32 of a PILC cable 10 having a conductor 14, an insulator 16 and a lead jacket 18, as in the above-described embodiment. Adaptor 180 is similar to adaptor 50 in that adaptor 180 includes a sleeve member 52, a conductor-sealing member 54, and a jacket-sealing member 56, all constructed in the same manner as described above in connection with adaptor 50.

However, in this instance, the dielectric filler which is to fill the space between the bared length of insulator 16 and the sleeve member 52 is in the form of a non-migrating dielectric fluid 182. Dielectric fluid 182 is placed within the sleeve member 52 and the jacket-sealing member 56 prior to placement of the adaptor 180 over the cable terminus 32. An electrical stress control member 184 having a construction similar to annular member 102 is installed as before. In this instance, however, member 184 is provided with additional vent passages 186 so that as the filled sleeve member 52 and jacket-sealing member 56 are slipped onto the cable terminus 32, excess dielectric fluid 182 is exuded through the vent passages 186, carrying any entrapped air away with the exuded dielectric fluid. Thus, the dielectric fluid 182 fills the entire space between the bared insulator 16 and the sleeve member 52.

The dielectric fluid 182 is non-migrating so that it will remain within the adaptor 180 and will not travel along the cable. Dielectric fluid 182 is fluid enough during initial assembly to minimize air entrapment and to bleed through vent passages 186, yet offers sufficient viscosity to prevent spilling during assembly. It will set up in a reasonably short period to a high viscosity gel-like compound which will prevent draining into the cable and provide increased dielectric strength. It must be compatible with the various oils encountered in cable 10. Dielectric oils, such as polybutene and silicone oils are suitable for dielectric fluid 182.

Figure 6:
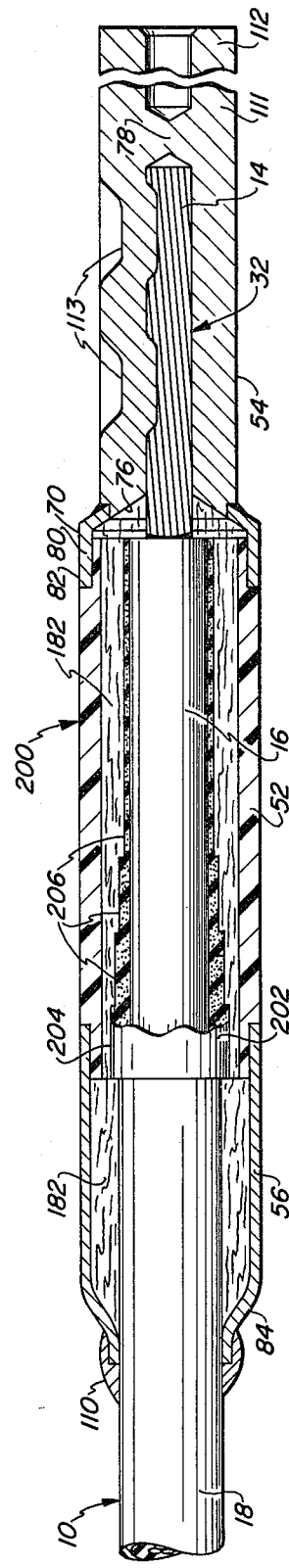
FIG. 6 is a longitudinal cross-sectional view of an alternate construction.

Referring now to FIG. 6, an alternate construction is shown in which an adaptor 200 is installed at the terminus 32 of PILC cable 10. In this instance, electrical stress control is achieved through the use of an electrical stress control member 202 having a tubular structure constructed of a stress grading material applied directly to the insulator 16 of cable 10, along the bared length of insulator 16 between the terminal end of the lead jacket 18 and the terminal end of the insulator 16. The illustrated stress grading material is a semi-resistive material applied either in the form of a semi-resistive tape or a tube of heat-shrinkable semi-resistive elastomeric material placed over the insulator 16. Stress grading is achieved by a construction which includes an outer surface 204 having a larger diameter adjacent the terminal end of the lead jacket 18, the outer surface 204 diminishing in diameter toward the terminal end of the insulator 16, by virtue of the stepped configuration 206. Alternately, stress grading can be attained utilizing a tubular structure of constant outside diameter by varying the resistivity of the material of the tube along the length thereof. The use of member 202 provides advantages in that its combines the stress relieving function with the function of the earlier-described wrapper 109 to maintain dimensional stability in the paper insulator 16. In addition, member 202 provides added stress relief at the high potential end of the adaptor 200, thus improving the stress distribution at the interface between the adaptor 200 and the further molded accessory which is to be placed over the adaptor.

It is to be understood that the above detailed description of preferred embodiments of the invention are provided by way of example only. Various details of design and construction may be modified without departing from the true spirit and scope of the invention as set forth in the appended claims.

The embodiments of the invention in which an exclusive property or priviledge is claimed are defined as follows:

1. An adaptor capable of placement at the terminus of a high voltage electrical cable having diametral dimensions falling within a given range of sizes, the cable being of the oil-filled type including a conductor, a paper insulator and a lead jacket, each having a terminal end adjacent the cable terminus, to seal the terminus and enable installation, in the field, of an electrical connector of the type employing a premolded elastomeric component part for use in an electrical power distribution system, the premolded elastomeric component part having an internal surface, said adaptor comprising:

a sleeve portion of insulating material extending axially between a first end and a second end, the sleeve portion having an axially extending outer surface complementary to the internal surface of the permolded elastomeric component part and an axially extending opening with an inside diameter larger than the diameter of the insulator of the cable of largest diameter in said given range of sizes, said insulating material being essentially impervious to water and to the oil in the cable;

a conductor-sealing portion integral with the first end of the sleeve portion and sealing the opening in the sleeve portion adjacent the first end thereof, the conductor-sealing portion having an axially extending, electrically conductive sheath including an internal passage communicating with the opening in the sleeve portion and corresponding in diameter to the diameter of the conductor of the cable, the internal passage having a closed end remote from the first end of the sleeve;

a jacket-sealing portion integral with the second end of the sleeve portion, the jacket-sealing portion including an axially extending tubular-walled portion capable of being juxtaposed with the lead jacket to seal the juncture between the lead jacket and the adaptor, the tubular-walled portion having an internal diameter greater than the external diameter of the lead jacket of the cable of largest diameter in said given range of sizes such that the lead jacket will be received within the tubular-walled portion, said tubular-walled portion being capable of permanent deformation toward the lead jacket for the formation of an oil and water seal therewith, in the field;

a dielectric filler for placement between the insulator of the cable and the sleeve portion of insulating material to fill any void therebetween; and an electrical stress control member for placement in juxtaposition with the terminal end of the lead jacket for controlling electrical stress along the interface between the insulator of the cable and the dielectric filler.

2. The invention of claim 1 wherein the tubular-walled portion is fabricated of a metal capable of being joined to the lead jacket to establish said oil and water seal.

3. The invention of claim 1 or 2 wherein the jacket-sealing portion is a unitary, electrically conductive metal member having an outer surface lying in a common outer surface with the outer surface of the sleeve portion.

4. The invention of claim 1 wherein the conductor-sealing portion includes a transition member affixed to the sleeve portion and a conductor connector element capable of being rendered integral with the transition member.

5. The invention of claim 4 wherein the transition member includes a metal collar contiguous with the first end of the sleeve portion, the collar having an axially extending outer surface lying in a common surface with the outer surface of the sleeve portion.

6. The invention of claim 4 or 5 wherein the conductor connector element includes:
   a ferrule which carries said internal passage for receiving the terminal end of the conductor; and
   a further connector for enabling direct connection of the conductor connector element in a completed electrical connection.

7. The invention of claim 6 wherein the ferrule is fabricated of a crimpable metal.

8. The invention of claim 1 wherein the dielectric filler includes a further sleeve of conformable elastomeric dielectric material for placement between the insulator of the cable and the inside diameter of the sleeve portion of the adaptor, the further sleeve having a wall thickness for compensating for dimensional variations resulting from said range of sizes of the cable.

9. The invention of claim 1 wherein the dielectric filler includes a non-migrating dielectric fluid.

10. The invention of claim 9 wherein the non-migrating dielectric fluid comprises a dielectric oil.

11. The invention of claim 1 wherein the electrical stress control member includes an annular member of electrically conductive elastomeric material having an inside diameter for gripping the cable adjacent the terminal end of the lead jacket, an outside diameter for engaging the sleeve portion and the jacket-sealing portion adjacent the second end of the sleeve portion, and an outwardly flared stress control profile configuration.

12. The invention of claim 11 wherein the dielectric filler includes a further sleeve of conformable dielectrical material for placement between the insulator of the cable and the inside diameter of the sleeve portion of the adaptor, the further sleeve having a wall thickness for compensating for dimensional variations resulting from said range of sizes of the cable.

13. The invention of claim 11 wherein the dielectric filler includes a non-migrating dielectric fluid and the electrical stress control member includes at least one vent passage for venting air and excess fluid during installation of the adaptor.

14. The invention of claim 13 wherein the dielectric fluid comprises a dielectric oil.

15. The invention of claim 1 wherein the electrical stress control member includes a tubular structure of stress grading material for placement along the insulator of the cable between the terminal end of the lead jacket and the terminal end of the insulator.

16. The invention of claim 15 wherein the tubular construction comprises a semi-resistive tape.

17. The invention of claim 15 wherein the tubular construction comprises a semi-resistive synthetic resin tube.

18. The invention of claims 15, 16 or 17 wherein the tubular construction includes an outer surface having a maximum diameter adjacent the terminal end of the lead jacket, said outer surface diminishing in diameter toward the terminal end of the insulator.

* * * * *

UNITED STATES PATENT AND TRADEMARK OFFICE
CERTIFICATE OF CORRECTION

PATENT NO. : 4,234,755
DATED : November 18, 1980
INVENTOR(S) : Craig W. Simons

It is certified that error appears in the above—identified patent and that said Letters Patent is hereby corrected as shown below:

Column 2, line 29, delete "components" and insert --component--

Column 3, line 15, delete "the" and insert --a--

Column 8, line 19, delete "permolded" and insert --premolded--

Signed and Sealed this

Twenty-fourth Day of March 1981

[SEAL]

Attest:

RENE D. TEGTMEYER

Attesting Officer   Acting Commissioner of Patents and Trademarks